United States Patent [19]

Mark et al.

[11] Patent Number: 4,459,366

[45] Date of Patent: Jul. 10, 1984

[54] PASSIVATING METALS ON CRACKING CATALYSTS

[75] Inventors: Harold W. Mark; Brent J. Bertus; John S. Roberts; Dwight L. McKay, all of Bartlesville; Lyle E. Fenska, Edmond, all of Okla.

[73] Assignee: Phillips Petroleum Company, Bartlesville, Okla.

[21] Appl. No.: 429,736

[22] Filed: Sep. 30, 1982

[51] Int. Cl.$^3$ .................... B01J 29/38; B01J 29/26; B01J 21/20; C10G 11/05

[52] U.S. Cl. .................... 502/25; 208/52 CT; 208/113; 208/120; 502/31; 502/38; 502/60; 502/63; 502/232; 502/263

[58] Field of Search ............ 252/411 R, 412, 414, 252/416; 502/25, 31, 38, 60, 63, 232, 263

[56] References Cited

U.S. PATENT DOCUMENTS

| | | | |
|---|---|---|---|
| 2,129,693 | 9/1938 | Houdry | 252/411 R |
| 2,640,834 | 6/1953 | Tewksbury et al. | 549/69 |
| 3,711,422 | 1/1973 | Johnson et al. | 252/414 |
| 4,016,150 | 4/1977 | Wiese et al. | 260/128 |
| 4,025,458 | 5/1977 | McKay | 252/416 |
| 4,031,002 | 6/1977 | McKay | 208/113 |
| 4,111,845 | 9/1978 | McKay | 252/455.2 |
| 4,321,129 | 3/1982 | Bertus et al. | 252/439 |
| 4,334,979 | 6/1982 | Bertus et al. | 252/411 R |

*Primary Examiner*—P. E. Konopka

[57] ABSTRACT

A cracking catalyst used to crack oil to produce gasoline or higher-boiling hydrocarbon fuel is contacted with both (A) antimony or a compound thereof such as antimony tris(O,O-dipropyl phosphorodithioate) and (B) a modifying composition consisting essentially of carbon, hydrogen, nitrogen, and sulfur produced by the treatment of a metal salt of a dialkyl dithiocarbamate with a hydrolyzable germanium (IV) compound such as germanium tetrachloride, the contacting of the ctalyst with (A) and (B) prior to, during, or after use of the catalyst in a cracking process being effective in precluding or reducing adverse effects of metals such as nickel, vanadium, and iron.

26 Claims, No Drawings

PASSIVATING METALS ON CRACKING CATALYSTS

This invention relates to the art of catalytic cracking of hydrocarbons and to catalysts, processes and catalyst modifying compositions useful in catalytic cracking of hydrocarbons. In another aspect, the invention relates to the regeneration of used cracking catalysts. In still another aspect, the invention relates to the passivation of metals on cracking catalysts.

BACKGROUND OF THE INVENTION

Hydrocarbon feedstock containing high molecular weight hydrocarbons is cracked by contacting it under elevated temperatures with a cracking catalyst whereby light distillates are produced. However, the cracking catalyst gradually deteriorates during this process. One cause of this deterioration is the deposition of metals, such as nickel, vanadium and iron, on the catalyst, which increases the production of hydrogen, dry gas and coke. At the same time the conversion of the hydrocarbons into gasoline is reduced. Thus, it is desirable to prevent or eliminate the adverse effects of such metal deposition, as by metals passivation, e.g., by contacting metals-contaminated catalyst with antimony-containing compounds and restoring the catalyst activity thereafter with conventional calcination techniques.

SUMMARY OF THE INVENTION

It is one object of this invention to catalytically crack hydrocarbons.

Another object of this invention is the regeneration of the used cracking catalyst.

A further object of this invention is the passivation of metals deposited on the cracking catalyst.

A still further object of this invention is to pretreat a cracking catalyst to prevent the deterioration normally caused by the deposition of metals.

Yet another object of this invention is to prevent the deterioration of a cracking catalyst due to deposition of metals by treating it during the process of catalytic cracking of hydrocarbons.

Further objects, embodiments, advantages and features of this invention will be apparent from the following detailed description of the invention and the appended claims.

In accordance with this invention, we have now found that contaminating metals deposited on cracking catalysts and deactivating said cracking catalysts can be passivated by contacting said cracking catalyst with the combination of antimony or compounds thereof and a composition consisting essentially of carbon, hydrogen, nitrogen, and sulfur, prepared by treating a soluble salt of a dialkyldithiocarbamate with a hydrolyzable germanium (IV) compound. Hereinafter the composition prepared by treating a soluble salt of a dialkyldithiocarbamate with a hydrolyzable germanium (IV) compound is identified as the "modifying composition"; it is prepared as disclosed in Example I and elsewhere herein.

Surprisingly, we have found that the contacting of a cracking catalyst with said combination of antimony or antimony compounds and the modifying composition prior to, during, or after use of the catalyst in a cracking process is effective in precluding or reducing the adverse effects of contaminating metals such as, for example, nickel, vanadium and iron. Furthermore, this combination is more effective than antimony or antimony compounds used alone, effecting a significant comparative reduction in hydrogen yield and an increase in gasoline yield.

Thus, in accordance with this invention we have provided an improved process for the catalytic cracking of hydrocarbons and an improved catalyst for such processes. Further in accordance with this invention we have provided processes for treating cracking catalysts prior to, during, or after use of the catalyst in a cracking process to preclude or reduce the adverse effects of contaminating metals.

DETAILED DESCRIPTION OF THE INVENTION

Treating Agents

Antimony

The form in which antimony is present in or on the cracking catalyst is not critical. Any antimony compound which provides passivation of contaminating metals deposited on a cracking catalyst can be utilized. Thus, elemental antimony, inorganic antimony compounds, and organic antimony compounds as well as mixtures of any two or more thereof are suitable sources of antimony. The term "antimony" hereinafter generally refers to any one of these antimony sources.

Examples of some inorganic antimony compounds which can be used include antimony oxides such as antimony trioxide, antimony tetroxide, and antimony pentoxide; antimony sulfides such as antimony trisulfide and antimony pentasulfide; antimony selenides such as antimony triselenide; antimony tellurides such as antimony tritelluride; antimony sulfates such as antimony trisulfate; antimonic acids such as metaantimonic acid, orthoantimonic acid and pyroantimonic acid; antimony halides such as antimony trifluoride, antimony trichloride, antimony tribromide, antimony triiodide, antimony pentafluoride and antimony pentachloride; antimonyl halides such as antimonyl chloride and antimonyl trichloride; antimonides such as indium antimonide; and the like. Of the inorganic antimony compounds, those which do not contain halogen are preferred.

Although organic antimony compounds for use in the preparation of the antimony containing catalysts preferably contain about 3 to about 54 carbon atoms for reasons of economics and availability, organic antimony compounds outside this range are also applicable. Thus, organic polymers containing antimony can be employed as the organic antimony compound. In addition to carbon and hydrogen, the organic antimony compound can contain elements such as oxygen, sulfur, nitrogen, phosphorus or the like.

Examples of some organic antimony compounds which can be used in the preparation of the antimony containing catalyst include antimony carboxylates such as antimony triformate, antimony trioctoate, antimony triacetate, antimony tridodecanoate, antimony trioctadecanoate, antimony tribenzoate, and antimony tris(cyclohexenecarboxylate); antimony thiocarboxylates such as antimony tris(thioacetate), antimony tris(dithioacetate) and antimony tris(dithiopentanoate); antimony thiocarbonates such as antimony tris(O-propyl dithiocarbonate); antimony carbonates such as antimony tris(ethyl carbonate); trihydrocarbylantimony compounds such as triphenylantimony; trihydrocarbylantimony oxides such as triphenylantimony oxide; antimony salts of phenolic compounds such as antimony triphenoxide; antimony salts of thiophenolic compounds such as antimony tris(thiophenoxide); antimony sulfonates such as antimony tris(benzenesulfonate) and antimony tris(p-toluenesulfonate); antimony carbamates such as antimony tris(diethylcarbamate); antimony thiocarbamates such as antimony tris(dipropyldithiocarbamate), antimony tris(phenyldithiocarbamate) and antimony tris(butylthiocarbamate); antimony phosphites such as antimony tris(diphenyl phosphite); antimony phosphates such as antimony tris(dipropyl phosphate); antimony tallates, the antimony salts of "tall oils", or mixtures of saturated and unsaturated fatty acids having from about 14 to about 20 carbon atoms; antimony dialkyl thiophosphates such as antimony tris(O,O-dipropyl thiophosphate) and antimony tris(O,O-dipropyl dithiophosphate) and the like. The last compound is also known as antimony tris(O,O-dipropyl phosphorodithioate), and is the presently preferred source of antimony, due in part to its solubility in hydrocarbons and its commercial availability. Mixtures of any two or more applicable substances comprising antimony can be employed.

Since the main purpose of the antimony on the catalytic cracking material is to prevent or mitigate the otherwise (without the antimony) occurring undesirable effects of contaminating metals, in particular, the increased hydrogen and coke production and the reduced yields of gasoline or higher-boiling hydrocarbon fuels such as kerosene, diesel fuel, and burning oils caused by these contaminating metals, the sources of antimony utilized and incorporated into or onto the cracking catalyst should be essentially free of such contaminating metals. The antimony sources thus should essentially contain no nickel, no vanadium, no iron, no copper and no cobalt or other detrimental contaminating metals.

Modifying Composition

The "modifying composition" is produced by treatment of a soluble salt of a dialkyldithiocarbamate with a hydrolyzable germanium (IV) compound.

The dialkyldithiocarbamate salts useful in this invention have the general formula

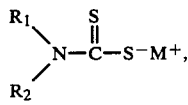

where $R_1$ and $R_2$ are selected independently from aliphatic or alicyclic radicals. The radicals $R_1$ and $R_2$ can generally have from 1 to about 20 or more carbon atoms, and $M^+$ can be the cation of an alkali or alkaline earth metal, the ammonium ion or a quaternary ammonium ion. By a quaternary ammonium ion is meant the ion $(R)_4N^+$, where each R is selected independently from hydrocarbyl radicals having from 1 to 20 or more carbon atoms, with the proviso that the resultant salt of the dialkyldithiocarbamate be soluble in the solvent used in the preparative reactions. Alkali metals are presently preferred because they produce the most soluble salts.

The dialkyldithiocarbamate salts can be prepared by any suitable method, such as for example by the reaction of carbon disulfide, an aliphatic secondary amine, and a soluble hydroxide compound with the cation selected from the group consisting of the alkali and alkaline earth metals and the ammonium or quaternary ammonium ion, preferably an alkali metal hydroxide. See, e.g., U.S. Pat. Nos. 3,210,409 and 3,778,460.

Secondary amines that are suitable reactants have the formula $R_1R_2NH$, where $R_1$ and $R_2$ are as defined above. Radicals which have from 1 to about 6 carbon atoms are preferred, because such compounds are usually effective and readily available. Examples include diethylamine, di-n-propylamine, di-isopropylamine, di-n-butylamine, methylcyclohexylamine, and the like.

The soluble hydroxides suitable for preparing the dialkyldithiocarbamate salts useful in this invention can be selected from the group of hydroxides of the alkali or alkaline earth metals, or of ammonium or quaternary ammonium. Hydroxides of any of the alkali metals—lithium, sodium, potassium, rubidium, and cesium—are preferred; potassium hydroxide is most preferred because of its solubility.

The reaction between carbon disulfide, the amine, and the hydroxide can be effected in at least two ways: carbon disulfide and the amine are first mixed and then the hydroxide is added incrementally, with cooling, to prevent either of the liquids from boiling; alternatively, the hydroxide and the amine are first mixed and the carbon disulfide is then added, the reaction mixture being kept cool enough to prevent loss of reactants by boiling. The latter method of combining reactants is preferred, because side reactions are thereby minimized. At this stage of the synthesis the reactants can be combined neat. However, the reaction is preferably effected in a suitable solvent, since the desired product is a solid. The three reactants—carbon disulfide, secondary amine, and hydroxide—are combined in essentially equimolar quantitites. The product of this reaction is a soluble salt, generally a metal salt of the dialkyldithiocarbamate.

A solution of the dithiocarbamate salt thus produced is added to a solution of the hydrolyzable germanium (IV) compound. The combination of these two solutions can be effected at any temperature between about 0° C. and the normal boiling point of the solvent. The molar ratios in which the dithiocarbamate salt and germanium compound are combined can range from about 1:1 to about 10:1. After the solutions have been combined the mixture is heated to solvent reflux temperature for at least one hour, then cooled to a temperature below about 50° C. and filtered. The "modifying composition" of this invention is in solution in the filtrate from this phase separation.

Hydrolyzable germanium (IV) compounds which can be used include the halides $GeX_4$, where X can be Cl, Br, F or I, and the germanium (IV) oxyhalides such as germanium oxychloride, $GeOCl_2$. Organometallic compounds of germanium (IV) can also be used, such as the alkoxides, represented by the formula $Ge(OR_3)_4$, where $R_3$ can be selected independently from hydrogen alkyl groups having from 1 to 20 carbon atoms; and hydrocarbyl germanium (IV) compounds, represented by the formula $Ge(R_4)_4$, where $R_4$ is selected independently from hydrocarbyl groups having from 1 to 20 carbon atoms. Mixed hydrocarbyl germanium (IV) halides represented by the formula $GeR_nX_{4-n}$, where R is a hydrocarbyl group having from 1 to 20 carbon atoms and X can be Cl, Br, F or I, can also be used. Also, mixtures of any of the above compounds can be used. Based on effectiveness, cost and availability, the halides $GeX_4$ are generally preferred. $GeCl_4$ is presently preferred because it is a liquid under standard conditions and has been used successfully.

Solvents suitable for making the dialkyldithiocarbamates and combining them with the hydrolyzable germanium (IV) compound to form the modifying composition comprise various polar solvents which are relatively inert to the reactants under the reaction conditions, such as, for example, ethers, esters, aromatic hydrocarbons and substituted aromatic hydrocarbons such as haloaromatics, and mixtures of any two or more thereof. Preferred solvents comprise dioxane, tetrahydrofuran (THF), and dimethylformamide. Tetrahydrofuran is presently most preferred because it is particularly effective in solubilizing the dialkyldithiocarbamate.

Applications

Compositions of this invention are used cracking catalysts that, during use, have become contaminated with enough vanadium, iron and/or nickel to impair their cracking selectivity to make gasoline, and have then been treated with antimony or a compound thereof and with the "modifying composition" to passivate at least partially the contaminant metals. A different embodiment of this invention is an unused cracking catalyst that has been treated with a suitable amount of antimony or a compound thereof and with a suitable amount of the "modifying composition" to reduce its susceptibility to the deleterious effects of deposited vanadium iron, and nickel. About 0.01 to 8 weight percent each, preferably about 0.1 to 1 weight percent, of antimony and of the "modifying composition" should be used to treat the catalyst according to this invention. The concentration of antimony is expressed as the weight percentage of the element in the catalyst, based on the weight of catalyst to be treated. Similarly, the concentration of "modifying composition" is expressed as the weight percentage of solvent-free product obtained from the treatment of the soluble salt of the dialkyldithiocarbamate with the hydrolyzable germanium (IV) compound, based upon the weight of catalyst to be treated.

The ratio (by weight) in which antimony and "modifying composition" are added to the untreated catalyst is preferably in the range 10:1 to 1:10; more preferably they are present in the range of a ratio 2:1 to 1:2, and most preferably, the ratio is in the range of 0.8:1 to 1.2:1, since a ratio in this range has been used successfully.

A variety of methods can be used to apply antimony or its compounds to the catalyst. It can be added as a finely divided solid and dispersed by rolling, shaking, stirring, etc., or it can be dissolved in a suitable solvent, aqueous or organic, and the solution used to impregnate the catalyst. Or it can be dissolved or dispersed in the hydrocarbon feedstock to the cracking process where it is deposited on and retained by the catalyst.

The "modifying composition" can also be added as a finely divided solid and dispersed by rolling, shaking, stirring, etc., or it can be dissolved in a suitable solvent, aqueous or organic, and the solution used to impregnate the catalyst. Or it may be dissolved or dispersed in the hydrocarbon feedstock to the cracking process where it is deposited on and retained by the catalyst.

On the laboratory scale, the "modifying composition" can be added to the catalyst prior to, simultaneously with, or after the addition of antimony. In operations above the laboratory scale, the same procedures can be used, but it is preferred to add the "modifying composition" and antimony simultaneously by dissolving them in the feedstock, as this method is both convenient and effective.

Cracking Catalysts

Cracking catalysts are compositions useful for cracking hydrocarbons in the absence of added hydrogen. They are used to convert the hydrocarbon feedstocks having a normal boiling point above 204° C. to more volatile compounds, e.g., gasoline and light distillates. Generally they contain silica or silica/alumina, frequently in association with zeolitic materials. These zeolitic materials can be naturally occurring or synthetic, and they usually are subjected to ion exchange treatment to improve the activity of the catalyst in which they are incorporated, by replacing at least part of the original alkali metal or alkaline earth cations with rare earth element cations and hydrogen ions, or with ions capable of conversion to hydrogen ions.

Unused cracking catalyst contains relatively little or no vanadium, iron, or nickel. The concentrations of these metals in unused catalyst will not exceed 0.06 weight percent vanadium, 0.8 weight percent iron, and 0.02 weight percent nickel. These concentrations refer to the total weight of the unused catalyst, but excluding added antimony treating agents and the modifying composition of this invention.

Feedstocks

Feedstocks appropriate to the catalytic cracking process of this invention contain significant concentrations of contaminating metals, e.g., vanadium, iron, and nickel. Their initial boiling point is above about 204° C.; they include gas oils, fuel oils, cycle oils, slurry oils, topped crudes, shale oils, oils from tar sands, from coal or coal liquefaction, mixtures of them, and the like.

The desirable concentration of "modifying composition" added to the cracking catalyst is related to the total effective metals content of the feedstock as shown in the following table:

TABLE I

| Total Effective Metals in Feedstock (ppm)[1] | "Modifying Composition" Concentration in Catalyst, Wt %[2] |
|---|---|
| 1–40 | 0.01–0.16 |
| 40–100 | 0.05–0.8 |
| 100–200 | 0.1–1 |
| 200–300 | 0.15–1.5 |
| 300–800 | 0.2–2 |

[1]"Total effective metals" is the sum of the concentration of vanadium and iron plus four times the concentration of nickel.
[2]Based on the weight of catalyst prior to the addition of antimony and "modifying composition".

The desirable concentration of antimony added to the cracking catalyst is similarly related to the total effective metals content in the feedstock. Thus, for example, at a total effective metals content in the feedstock of 300–800 ppm, a suitable antimony concentration in the catalyst would be in the range from about 0.2 to about 8 wt percent, employed in a ratio of about 10:1 to 1:10 with respect to the amount of modifying composition.

When introducing antimony and the modifying composition of the present invention in the feedstock, two modes of addition are most common. First, one can treat a fresh catalyst or a catalyst in which contaminating metals are to be passivated with a relatively large slug oi antimony and modifying composition over a relatively short period of time, effective to pretreat the catalyst or passivate deposited metals. This mode of treatment is preferred for treatment of a cracking catalyst that has been substantially inactivated by the deposition of metal contaminants from the feedstock. Sufficient antimony and modifying composition would be added to the feed so that catalyst would be exposed to about 0.02 to about 2 pounds of each component per pound of total effective metal deposited on the catalyst over a period of about 24–96 hours, depending on the feedstock flow rate, volume of catalyst of be treated, and the like.

Alternatively, one can treat catalyst continuously with antimony and modifying composition at a maintenance level sufficient to passivate contaminating metals as they are introduced in the feedstock. Thus, sufficient antimony and modifying composition would be added to the feed so that catalyst would be exposed to an amount in the range from about 0.03 to about 3.0 pounds of each component per pound of total contaminant metals introduced by the feedstock on a continuous or semicontinuous basis. For example, by testing the feedstock for the content of at least one contaminating metal and estimating the total contaminating metals entering the reactor during a unit time, the amount of antimony and modifying composition to be added in such a unit time can also be estimated. As discussed earlier, the modifying composition and antimony can be added in approximately equal quantities, or in various proportions.

Since reactor systems, catalysts and feedstocks can be expected to differ in their response to the treatments disclosed herein, it is preferred to periodically test the product as well as the feedstock, adjusting the amount and proportions of antimony and modifying composition to optimize, e.g., the yield and quality of the product, indicating that an effective amount of antimony and modifying composition are being provided to passivate the contaminating metals which pass through the reactor.

Process Conditions

In the process of this invention catalytic cracking of feedstocks is effected either in a fixed catalyst bed or with a fluidized catalyst operation. The latter is preferred, since better contact of the feedstock with catalyst is obtained. Specific conditions in the cracking zone and the regeneration zone of a fluid catalytic cracker depend upon the feedstock used, the condition of the catalyst, and the product sought. In general, conditions in the cracking zone include:
Temperature: 427°–593° C. (800°–1100° F.)
Time: 1–40 seconds
Pressure: 10 kPa to 21 MPa (0.1 to 205 atm.)
Catalyst/oil ratio: 3/1 to 20/1, by wt.
Conditions in the regeneration zone generally include:
Temperature: 621°–732° C. (1150°–1350° F.)
Time: 2–40 minutes
Pressure: 10 kPa to 21 MPa (0.1 to 205 atm.)
Air rate (at 16° C., one atm.): 100–250 ft.$^3$/lb. coke or 6.2–15.6 m$^3$/kg coke The following examples are intended to illustrate the invention and describe further preferred features without undue limitation of the invention.

EXAMPLE I

"Modifying composition" was prepared by slowly adding 65.8 g (0.865 mol) of carbon disulfide dissolved in 100 mL of THF to 43.0 g (0.766 mol) of potassium hydroxide and 56.3 g (0.769 mol) of diethylamine dissolved in 50 mL of THF. The vessel in which the reaction was made was cooled in a cooling bath during the addition. After the reactants had been combined another 100 mL of THF was added, the mixture refluxed for about 3 hours, and was cooled to ambient temperature and allowed to stand overnight. Volume of the solution was then reduced to about half by removal of solvent on a rotary evaporator. Upon cooling, crystals formed which were separated by filtration and washed with diethyl ether. Assuming the product to be potassium diethyldithiocarbamate, $C_5H_{10}KNS_2$, it was calculated that the product should contain weight percentages of 32.05% C, 5.39% H, 7.48% N.; however, by chemical analysis the weight percentages were 27.57% C, 4.80% H, 6.46% N.

Then an amount of 43.1 g (0.230 mol) of the dithiocarbamate produced above was dissolved in 100 mL of THF and the solution was added dropwise to 12.37 g (0.0577 mole) of germanium tetrachloride dissolved in 300 mL THF, with stirring. The solution was refluxed for about 4 hours after the reactants had been combined, cooled, and filtered. Solvent was removed from the filtrate on a rotary evaporator to produce a product that crystallized upon cooling. It was recrystallized from n-hexane plus THF solution to produce 24.5 g of "modifying composition". Elemental analysis showed weight percentages of 46.72% C, 9.45% H, and 12.34% N.

Another preparation of "modifying composition" was made essentially as described above and was analyzed more completely than this material. Its analysis showed weight percentages of 47.97% C, 10.02% H, 12.56% N, 26.4% S, and <0.05% Ge. The weight percentages for carbon and sulfur were considered accurate to ±1.0 percent, while those for hydrogen and nitrogen were considered accurate to ±0.3 percent. Examination of it by thin layer chromatography indicated that it comprises at least three different compounds. None of them has been identified.

Based upon these analyses, it is believed that effective "modifying compositions" contain at least C, H, N, S and Ge in the indicated ranges of percent by weight of the total modifying composition:

Carbon, 46–49 weight percent
Hydrogen, 9–10.5 weight percent
Nitrogen, 12–13 weight percent
Sulfur, 25–27.5 weight percent
Germanium, less than 0.1 weight percent

EXAMPLE II

A commercial fluid cracking catalyst comprising amorphous silica-alumina and rare earth cation-exchanged zeolite, which had been used in a commercial fluid catalytic cracker until it had attained equilibrium composition with respect to metals accumulation (catalyst was being removed from the process system at a constant rate) was used to demonstrate the effect of treatment with both antimony and "modifying composition". Table II summarizes the composition as determined by analysis, and some pertinent physical properties of this catalyst, designated catalyst 0.

TABLE II

| | |
|---|---|
| Surface area, m$^2$/g | 74.3 |
| Pore volume, mL/g | 0.29 |
| Composition, wt. % | |
| Aluminum | 21.7 |
| Silicon | 24.6 |
| Sodium | 0.39 |
| Vanadium | 0.60 |

TABLE II-continued

| | |
|---|---|
| Iron | 0.90 |
| Nickel | 0.38 |
| Cerium | 0.40 |
| Carbon | 0.06 |

Portions of catalyst O were used to prepare three catalysts containing antimony and "modifying composition" as follows.

Catalyst A was prepared by adding 0.363 g of antimony tris(dipropylphosphorodithioate) dissolved in 40 mL of cyclohexane to 40 g of catalyst O. After mixing, solvent was removed by evaporation and the dry catalyst was placed in a vertical quartz tube reactor in a tube furnace. While being fluidized with nitrogen the catalyst was heated to 428° C. Nitrogen was replaced with hydrogen and the temperature was raised to 649° C. Nitrogen replaced hydrogen and the catalyst was fluidized for 5 minutes to purge the reactor after which the catalyst was fluidized with air for 15 minutes at that temperature. Catalyst A contained 0.10 wt. % antimony.

Catalyst B was prepared by adding 0.036 g of "modifying composition" dissolved in 40 mL of toluene to 40 g of catalyst O. After mixing, solvent was removed by evaporation, the dry catalyst was placed in a quartz reactor and conditioned using the same procedure described above for catalyst A.

Catalyst C was prepared by adding a solution that contained 0.363 g of antimony tris(dipropylphosphorodithioate) and 0.036 g of "modifying composition" dissolved in 40 mL of toluene to 40 g of catalyst 0. After mixing, solvent was removed by evaporation, the dry catalyst was placed in a quartz reactor and conditioned using the same procedure described above for catalyst A.

The regeneration periods lasted for 20 to 60 minutes, typically for about 30 minutes, at temperatures in the range 621°–677° C. (1150–1250 F.), typically at about 649° C. (1200 F.).

Catalysts O, A, B, and C were used in runs to crack gas oil. Before they were used, catalysts A, B, and C were aged by being subjected to the following treatment after receiving the conditioning already described. The catalyst at about 482° C. was fluidized with nitrogen for one minute, then heated to 510° C. during two minutes while fluidized with hydrogen, then maintained at 510° C. for one minute while fluidized with nitrogen, then heated to about 649° C. for 10 minutes while fluidized with air, and then cooled to about 482° C. during 0.5 minutes while fluidized with air. After 10 such cycles the catalysts were cooled to room temperature while being fluidized with nitrogen.

Cracking runs with all four catalysts were made using a gas oil feedstock in fluidized bed reactors at 510° C. and atmospheric pressure with 0.5 minute cracking periods and intervening regeneration periods in air at atmospheric pressure. Some properties of the gas oil are summarized in Table III.

TABLE III

| | |
|---|---|
| API gravity at 60° F. | 25.8° |
| BMCI | 41.1 |
| Carbon Residue | 0.87 wt. % |
| Sulfur | 0.40 wt. % |
| Nitrogen | 0.07 wt. % |

| Distillation analysis (ASTM D 1160-77) | |
|---|---|
| percent | °Fahrenheit |
| 2 | 498 |
| 10 | 566 |
| 20 | 621 |
| 30 | 669 |
| 50 | 759 |
| 70 | 842 |
| 90 | 973 |
| 95 | 1047 |

Series of cracking runs were made on each catalyst in which the catalyst/oil ratio was varied to obtain the desired range of conversion. Gas and liquid products were analyzed by GLC and the reactor was weighed to determine coke. A smooth curve was calculated from the data points and results at a catalyst to oil ratio of 7.7 to 1 are presented in Table IV. (In each run the material balance was >95%).

TABLE IV

| | | Yields | | | Cat. Additive, Wt. % | |
|---|---|---|---|---|---|---|
| Catalyst | Conversion Vol. % | Coke, Wt. % | SCF H$_2$/bbl | Gasoline, Vol. % | Sb | "Modifying Composition" |
| 0 | 64.0 | 8.0 | 640 | 53.3 | Nil | Nil |
| A | 64.8 | 6.0 | 410 | 55.0 | 0.1 | Nil |
| B | 63.8 | 7.8 | 562 | 51.6 | Nil | 0.09 |
| C | 67.0 | 6.4 | 290 | 59.0 | 0.1 | 0.09 |

Comparison of results from catalysts O and A shows, as has already been disclosed, that the addition of antimony to a metals-contaminated cracking catalyst increases the yield of gasoline while decreasing the yields of hydrogen and coke. Comparison of results from catalysts O and B shows that treatment of the catalyst with "modifying composition" had only a small effect—reducing coke yield slightly and hydrogen yield significantly but reducing the yield of gasoline. However, comparison of results from catalysts A and C shows that the combination of "modifying composition" and antimony to treat a contaminated FCC catalyst surprisingly effects a 29.3% reduction in hydrogen yield and a 7.3% increase in gasoline yield over the catalyst that was treated with antimony only.

While this invention has been described in detail for the purpose of illustration, it is not to be construed as limited thereby, but is intended to cover all the changes and modifications within the spirit and scope thereof.

We claim:

1. A process for passivating metal contaminants on a cracking catalyst comprising materials selected from the group consisting of silica, silica-alumina and zeolites, which process comprises contacting said catalyst with antimony and a modifying composition in amounts effective to passivate said metal contaminants, said modifying composition being prepared by contacting a dialkyldithiocarbamate in solution form with a hydrolyzable germanium (IV) compound and recovered in the liquid phase, said modifying composition being substantially germanium free.

2. A process in accordance with claim 1, wherein said antimony and said modifying composition are added to said catalyst in its unused state.

3. A process in accordance with claim 1, wherein said antimony and said modifying compostion are added to a catalyst which has become contaminated with at least one metal of the group consisting of nickel, vanadium and iron.

4. A process in accordance with claim 3, wherein said catalyst is contacted with said antimony and said modifying composition, and heat treated therewith in the presence of free oxygen to regenerate said catalyst.

5. A process in accordance with claim 1, wherein said antimony and said modifying composition used to contact said catalyst are from about 0.01 to about 8 weight percent of said catalyst, and are present in a ratio by weight of from about 0.1 to about 10 parts antimony to each one part of modifying composition.

6. A process in accordance with one of claims 1, 2 or 3, wherein said antimony and said modifying composition are dissolved or dispersed in the hydrocarbon feedstock to the cracking process, where they are deposited on and retained by said catalyst.

7. A process in accordance with claim 3, wherein said antimony and said modifying composition are dissolved or dispersed in the hydrocarbon feedstock to the cracking process in amounts in the range of from about 0.02 to about 2 pounds per pound of total effective metal deposits on said catalyst.

8. A process in accordance with claim 7, wherein said antimony is added to said feedstock in a ratio in the range of from about 10:1 to about 1:10 with respect to the amount of modifying composition added to said feedstock.

9. A process in accordance with claim 1, wherein said antimony and said modifying composition are added to said catalyst in its unused state or to a catalyst which has become contaminated with at least one metal of the group consisting of nickel, vanadium and iron, and wherein said antimony and said modifying composition are dissolved or dispersed in the hydrocarbon feedstock to the cracking process in amounts in the range of from about 0.03 to about 3 pounds of each component per pound of contaminant metals introduced by said feedstock.

10. A process in accordance with claim 9, wherein said antimony is added to said feedstock in a ratio in the range of from about 10:1 to about 1:10 with respect to the amount of modifying composition added to said feedstock.

11. A process in accordance with claim 1, wherein said modifying composition consists essentially of carbon, hydrogen, nitrogen and sulfur.

12. A process in accordance with claim 1, wherein said hydrolyzable germanium (IV) compound is a germanium (IV) halide, a germanium (IV) oxyhalide or a germanium (IV) organometallic compound selected from the group consisting of (1) germanium (IV) alkoxides, represented by the formula Ge(OR₃)₄, where R₃ can be selected independently from hydrogen and alkyl groups having from 1 to 20 carbons; (2) hydrocarbyl germanium (IV) compounds, represented by the formula Ge(R₄)₄, where R₄ is selected independently from hydrocarbyl groups having from 1 to about 20 carbon atoms; and (3) mixed hydrocarbyl germanium (IV) halides, represented by the formula GeR$_n$X$_{4-n}$, where R is a hydrocarbyl group having from 1 to about 20 carbon atoms and X can be Cl, Br, F or I, with n having values of 1, 2 or 3; and mixtures of any of these halides and/or organometallic compounds of germanium (IV).

13. A process in accordance with claim 12, wherein said hydrolyzable germanium (IV) compound is a germanium (IV) halide.

14. A process in accordance with claim 13, wherein said germanium (IV) halide is GeCl₄.

15. A process in accordance with claim 1, wherein said dialkyldithiocarbamate is combined with said hydrolyzable germanium (IV) compound in a weight ratio of one part of said dialkyldithiocarbamate to from about 0.1 to about one part of said germanium (IV) compound.

16. A process in accordance with claim 15, wherein said dialkyldithiocarbamate and said germanium (IV) compound are combined in solution with a suitable polar solvent, the molar concentration of said dialkyldithiocarbamate being in the range from about 0.1 to about 10 moles per liter.

17. A process in accordance with claim 16, wherein said solvent is an ether, an ester, a substituted or unsubstituted aromatic hydrocarbon, or a mixture of any two or more thereof.

18. A process in accordance with claim 17, wherein said solvent tetrahydrofuran, dioxane or diethylformamide.

19. A process for passivating metal contaminants on a cracking catalyst comprising materials selected from the group consisting of silica, silica-alumina and zeolites, which process comprises contacting said catalyst with antimony and a modifying composition in amounts effective to passivate said metal contaminants, said modifying composition being prepared by contacting in solution form a hydrolyzable germanium (IV) compound and dialkyldithiocarbamate having the general formula

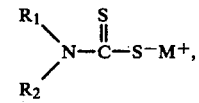

where R₁ and R₂ are selected independently from aliphatic or alicyclic radicals and M+ is a cation of an alkali or alkaline earth metal, the ammonium ion, or a quaternary ammonium ion and recovered in the liquid phase, said modifying composition being substantially germanium free.

20. A process in accordance with claim 19, wherein the dialkyldithiocarbamate-derived portion of said modifying composition consists of the following elements in the indicated ranges of percent by weight:
Carbon, 46–49 weight percent
Hydrogen, 9–10.5 weight percent
Nitrogen, 12–13 weight percent
Sulfur, 25–27.5 weight percent.

21. A process in accordance with claim 19, wherein R₁ and R₂ have from one to about 20 carbon atoms.

22. A process in accordance with claim 19, wherein said M+ is an alkali metal cation.

23. A process in accordance with claim 22, wherein said alkali metal is lithium, sodium or potassium.

24. A composition in accordance with claim 23, wherein said alkali metal is potassium.

25. A process in accordance with claim 19, wherein the reactants comprise potassium diethyldithiocarbamate and germanium tetrachloride, and wherein said modifying composition contains at least the following elements in the indicated ranges of percent by weight:

Carbon, 46–49 weight percent
Hydrogen, 9–10.5 weight percent
Nitrogen, 12–13 weight percent
Sulfur, 25–27.5 weight percent
Germanium, less than 0.05 weight percent.

26. A process for passivating metal contaminants on a cracking catalyst comprising materials selected from the group consisting of silica, silica-alumina and zeolites, which comprises contacting said catalyst with antimony and a modifying composition in amounts effective to passivate said metal contaminants, wherein said modifying composition is prepared by a method comprising the steps of:

(a) contacting an aliphatic secondary amine with carbon disulfide and a soluble hydroxide compound with the cation selection from the group consisting of alkali and alkaline earth metals, ammonium and quaternary ammonium ions, and (b) contacting the product of (a) in solution form with a hydrolyzable germanium (IV) compound to produce a mixture, said modifying composition being in the liquid phase of this mixture and said modifying composition being substantially germanium free.

* * * * *